TRANSDUCER HEAD PRESSURE CONTROL APPARATUS
HAVING ADJUSTABLE PRESSURE FEATURE

Filed April 24, 1967

Inventor:
Andrew Balint
By William J. [signature] John E. Peele Jr. Attys

United States Patent Office 3,493,693
Patented Feb. 3, 1970

3,493,693

TRANSDUCER HEAD PRESSURE CONTROL APPARATUS HAVING ADJUSTABLE PRESSURE FEATURE

Andrew Balint, Park Ridge, Ill., assignor to Bell & Howell Company, Chicago, Ill., a corporation of Illinois Filed Apr. 24, 1967, Ser. No. 633,278
Int. Cl. G11b *5/00;* G01d *15/06*
U.S. Cl. 179—100.2 4 Claims

ABSTRACT OF THE DISCLOSURE

An aerodynamic mechanism to hold a traveling web under selected uniform pressure in recording or reading scanning relationship against an associated transducer head for production of optimum sound resolution.

The present invention relates to pneumatic apparatus for controlling intersurface bearing relationship of relatively movable members. Particularly, the invention relates to apparatus adapted for record-reproduce machines which have a transducer for recording sound indicia on or sensing such indicia for playing from media supported on a relatively movable carrier or web, such as a film or tape. Specifically the invention relates to a record-reproduce machine such as a motion picture film printer, having a pneumatic control mechanism to govern bearing relationship between a transducer and a media carrier web.

In heretofore known record machines of the class with which the present invention is concerned, a transducer head and a relatively movable media carrier are associated in aerodynamically controlled spaced apart relationship during operation. Nevertheless, leading to the present disclosure, it was determined that a high carrier speeds encountered in modern record machines intimate or direct contact between a transducer and a media carrier under uniform pressure are required to produce highest sound resolution. However, application of greater pressure than that required to produce scanning engagement of the relatively movable parts results in needless wear on both.

In accordance with the present invention and as an object thereof, improved control means adapted for a record machine of the indicated type are provided to govern bearing relationship between relatively movable parts, particularly a transducer and media carrier.

It is another object of the invention to provide control means constructed for holding said relatively movable parts in scanning association with each other.

It is a further object of the invention to provide control means adapted to generate and maintain contact pressure of selectable magnitude for such scanning associations.

It is an additional object of the invention to provide control means which are aerodynamic to the end that there is immediate and balancing response to forces which tend to vary contact pressure of an associated transducer and media carrier.

It is yet another object of the invention to provide control means which are arranged to apply such scanning pressure against a surface of a media carrier which is remote from a transducer.

Further and other objects, features and advantages of the present invention will be apparent from the description when considered in conjunction with the accompanying drawings in which like numerals refer to like parts.

Figure 1:
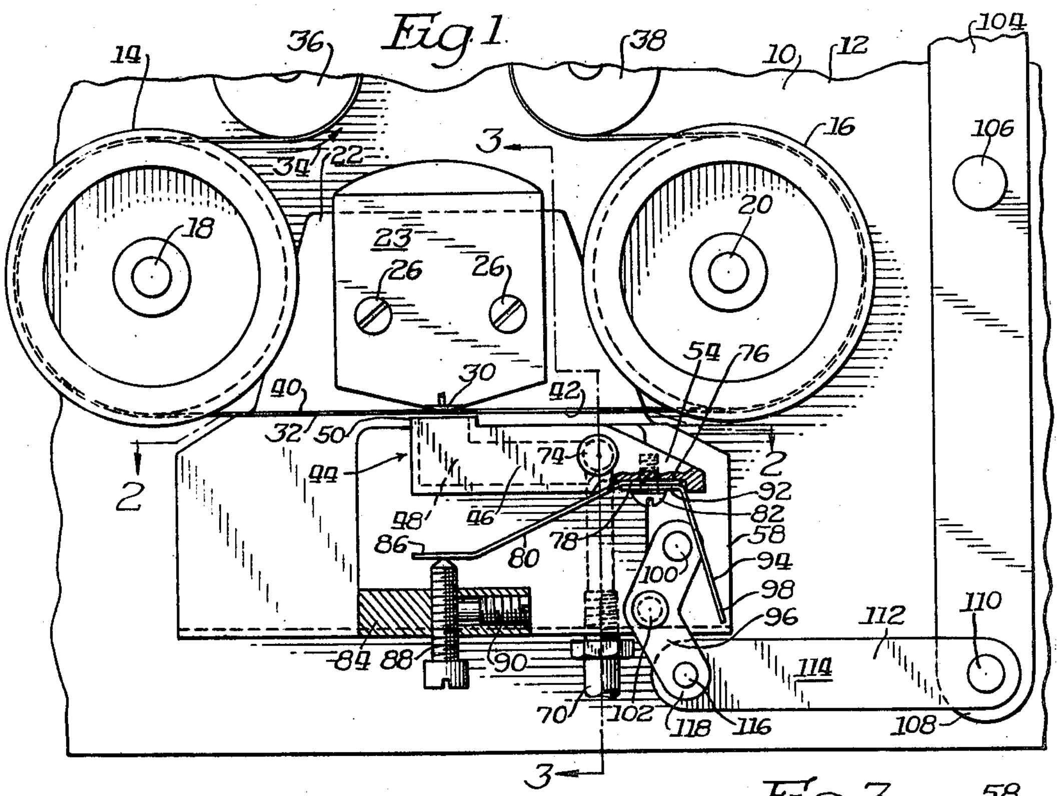
FIG. 1 is an elevational view of one form of the present invention showing the same embodied in a record machine only a portion of which has been shown.

Referring now more particularly to FIG. 1, there is shown a portion of a magnetic recorder-reproducer machine generally designated 10 and comprising a deck 12. Guide roller means comprising a first roller 14 and a second roller 16 are rotationally arranged adjacent said deck. A shaft 18 and a shaft 20 respectively provide axis means for rollers 14 and 16. The shafts project normally from deck 12 in spaced apart association sufficient to generate a space 22 between said rollers.

A transducer assembly 23 of conventional construction is adapted for magnetic recording and reproducing. A pair of screws 26 fixedly secure said transducer to deck 12 in space 22. Transducer 23 comprises a core which may be conventionally gapped at what may be considered its front end opening or nose 30.

A record media carrier is shown as a web 32 such as a tape or film strip. Said web has a first surface 40 adjacent transducer 23 and a second or rear surface 42 remote from the transducer. Longitudinally of surface 40, said web supports track means of magnetic media (not shown) adapted for recording information thereon and reproducing the recorded information therefrom. To that end rollers 14 and 16 are disposed on opposite sides of said transducer head in alignment with nose 30 to hold said web surface 40 in scanning relationship with the nose. The exemplary direction of the the path of said web while conditioned for recording follows arrow 34 (FIG. 1).

Further defining the path of said web 32 are idler means comprising a pair of idler or tension rollers 36 and 38, shown only fragmentarily. They are suitably disposed relative to guide rollers 14 and 16 and conventional take-up and supply means, respectively (not shown). Power means, which may be conventional and therefore are omitted from the drawings, may comprise a conventional drive for such unseen take-up and supply reels to selectively and reversibly move the web 32.

Figure 2:
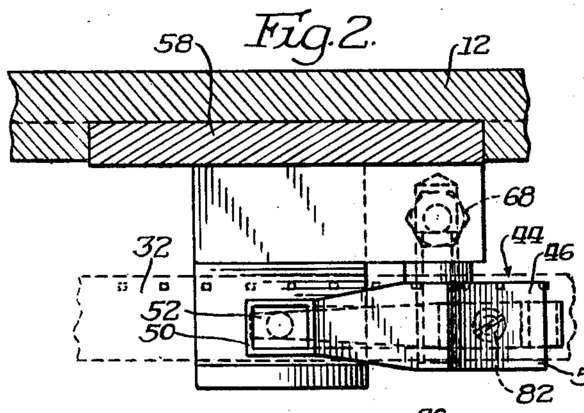
FIG. 2 is a planar projection of the sections indicated by the broken line 2—2 of FIG. 1 and looking in the direction of the arrows.

The invention is characterized by fluid supply means generally designated 44 and herein comprising an air arm 46 with a therethrough extending passage 48 for air flow. A transducer proximate end of arm 46 defines a mouth 50 having an end opening 52 (FIG. 2) in fluid connection with passage 48 and arranged adjacent web surface 42. Mouth 50 is aligned with transducer nose 30 transversely of web 32. Air arm 46 is freely swingable in a plane parallel to deck 12 by reason of pivotable connection of its end portion 54 opposite the mouth.

Figure 3:
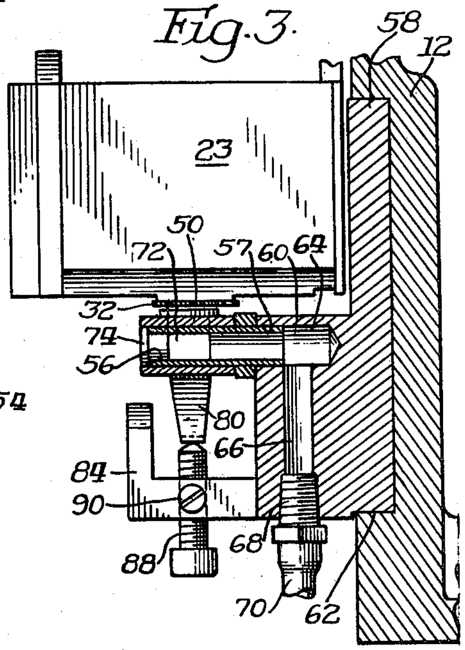
FIG. 3 is a planar projection of the sections indicated by the broken line 3—3 of FIG. 1 and looking in the direction of the arrows.

To that end, said last arm portion is journaled on a sleeve 56 (FIG. 3). A casting 58, which has an outwardly opening sink or well 60, is securely or rigidly retained in a pocket 62 formed in deck 12. An inner end portion 57 of the sleeve 56 is rigidly secured in well 60 by press fit or the like whereby said sleeve extends outwardly from said casting normally to the general plane of said deck.

Well 60 has a closed end portion 64 beyond the inner end of sleeve 56. Casting 58 has a bore 66 disposed normal to said well 60. The inner end of said bore is arranged in gas communication with the well end portion 64. The outer end of the bore 66 opens outwardly of said casting and is fashioned for reception of a delivery end of a fitting 68 of an air pressure line 70 (FIG. 3). Accordingly, sleeve 56 and the air pressure line 70 are in fluid communication. Said sleeve has a window or opening 72 which is disposed within the arm 46 in gas continuity with passage 48. Thereby gas continuity is established between mouth opening 52 and air pressure line 70.

A suitable closure plug or other air seal member 74 is arranged in the outer end of sleeve 56. By means (not shown), which may be conventional, air pressure in line 70 and accordingly at mouth opening 52 may be selectively adjusted in accordance with requirements which will become apparent presently.

Air arm end portion 54 is recessed to provide a seat 76. A leaf spring 80 has a bent end portion 78 which is anchored in said seat by a suitable fastener such as a connecting screw 82. Said spring has an opposite bearing end 86 which serves as a screw abutment. A bracket 84, rigidly supported from casting 58, is arranged adjacent end 86 of said spring. An adjusting screw 88 is threadingly engaged in a socket formed through bracket 84. The inner end of the adjusting screw is adapted for adjustable bearing engagement against spring end 86 to selectively adjust biasing tension in said spring.

The foregoing construction and arrangement is such that as the screw 88 is threaded to increase or decrease tension in bearing end 86 by manual adjustment, respectively, toward or away from said air arm, pressure of mouth 50 against web surface 42 will increase or decrease, respectively. Thereby pressure with which the web surface 40 engages nose 30 can be selectively varied. A set screw 90 which threadingly engages in the bracket 84 may be provided as illustrated in FIG. 1 to hold adjusting screw 88 in selectively adjusted positions.

One end portion 92 of a rocker member 94 having an outwardly extending portion 98 is secured to air arm end portion 54 by screw 82 against the spring end portion 78. A rocker control member 96 has a thereto fixed boss 100 which is slidingly disposed in bearing engagement with rocker member end portion 98. Control member 96 is arranged about a fixed pivot 102 for rocking movement to adjust engagement tension between said last boss and said rocker arm.

For management of control member 96, a movable arm 104 is rockably connected to the deck 12 by means of a fixed pivot 106 (FIG. 1). Said movable arm has a handle portion (not shown) and an opposite end portion 108. The latter and an end portion 112 of a link 114 are connected by means of a movable pivot 110. An opposite end portion of the link 114 and an end portion 118 of rocker arm 96 are connected by a movable pivot 116.

Figure 4:
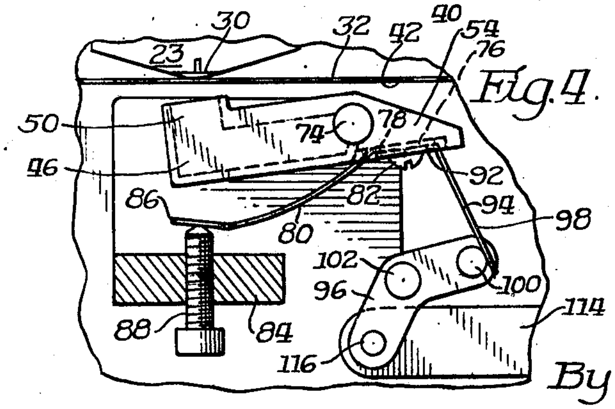
FIG. 4 is an elevational view similar to FIG. 1 showing the air arm in a disengaged position.

The mechanism including rocker member 94 and rocker control member 96 are employed for loading and removing the web 32. That is to say, web 32 can be selectively threaded in or moved from operative condition by moving control lever 104 to the right with respect to FIG. 1. Through the linkage heretofore described, such movement causes control member 96 to rock clockwise from the position of FIG. 1 to the position of FIG. 4. The parts are proportioned in a manner so that upon such last movement boss 100 will slide against and apply an increasing tension on the end portion 98 of the rocker member 94 against the normal biasing action of spring 80 and thereby cause air arm 46 to rock from the position of FIG. 1 toward the position of FIG. 4 thereby to disengage the mouth 50 from the web surface 42. Once the web 32 has been threaded on recorder 10, arm 104 may be returned to record condition. Accordingly, tension in arm 94 will be relieved sufficiently to cause return of air arm 46 toward operative condition under spring bias.

To then operate the recorder, spring 80 is provisionally loaded by adjustment of screw 88 to a level which is judged sufficient to cause mouth 50 to press against web surface 42 with a force adequate to cause scanning engagement of web surface 40 by nose 30. A sample recording then is made at machine speed and the level of sound resolution is determined. Thereafter, further adjustment of the pressure of mouth 50 may be made in an endeavor to procure the best possible resolution.

Whenever machine operation is commenced, air pressure of sufficient magnitude is introduced into air arm 46 to cause mouth 50 to float away from the web 32. A condition of equilibrium is reached when the air pressure just matches the spring induced tension in said air arm. By increasing air pressure slightly beyond that required to freely float said air arm, a cushion is provided which will accommodate all variations within a normal system tending to vary the pressure with which said web is held against the nose 30. Moreover, the foregoing arrangement of parts will condition said web so that it is continuously maintained under constant pressure against the nose 30. Furthermore, the foregoing arrangement distributes pressure on said web to cause it to wrap or bend about the nose beyond its high point to further maximize contact and accordingly resolution. One caveat however. The area of mouth 50 should be minimized to a limit compatible with the present invention to preclude production of the Bernoulli effect between said web and said mouth.

As will be appreciated by those knowledgeable in the art, as regards the present invention, the described transducer head may be singular elements for recording, erasing and reproducing information or may be a combination head. Also, the invention is limited neither to the specific shape nor to the construction of media carrier described.

Although the invention has been particularly described with reference to a preferred embodiment thereof, it is to be understood that modifications and variations may be effected without departing from the scope of the invention.

The embodiments of the invention in which an exclusive property or privilege is claimed are defined as follows:

1. Apparatus for support of a carrier having media supporting and opposite surfaces for movement past and in operative association with a transducer, said apparatus comprising:

a rockable arm having an end portion on which a mouth is movable into operative relationship with and adjacent to said opposite surface, said arm having a gas duct arranged to direct flow through said mouth against said opposite surface to engage said transducer and said mediate supporting surface with selected bearing force;

pivot means mounting said arm for rocking motion; and tensioning means connected to said end portion whereby upon gas flow from said mouth under pressure to overcome the tensioned force in said arm, said mouth will float away from said carrier.

2. Apparatus as defined in claim 1 in which said arm has an end portion on which said mouth and pivot means for rocking said arm are arranged, and said tensioning means is connected to said end portion.

3. Apparatus as defined in claim 1 which said tensioning means comprise opposed baising members engaging said arm to hold said mouth in adjusted positions and adjusting means to selectively tension said biasing members to move said mouth to or away from said carrier.

4. Apparatus to support a carrier having media supporting and opposite surfaces for movement past and in operative association with a transducer, said apparatus comprising:

a rockable arm having a mouth arranged for location into an operative position in alignment with and adjacent to said opposite surface, and for location in a nonoperative position, said arm having a mouth structure and a pneumatic duct arranged to direct a gas flow through said mouth against said opposite surface of said carrier to cause said media support surface to engage said transducer with selected bearing force; and spring means for adjustably biaising said mouth toward said media support for variably tensioning said mouth of said arm relative to said carrier, whereby upon gas flow from said mouth under pressure to overcome the tensioned force in said arm, said mouth will float away from said media support.

References Cited

UNITED STATES PATENTS

| | | | |
|---|---|---|---|
| 2,682,410 | 6/1954 | Bauman | 274—4 |
| 2,957,049 | 10/1960 | Uritis | 179—100.2 |
| 3,018,152 | 1/1962 | Cowan | 340—174.1 |
| 3,213,461 | 10/1965 | Goddard | 179—100.2 |
| 3,418,434 | 12/1968 | Groenewegen | 179—100.2 |

BERNARD KONICK, Primary Examiner

J. R. GOUDEAU, Assistant Examiner

U.S. Cl. X.R.

226—95, 97; 274—4; 340—174.1; 346—74